(12) United States Patent
Murata (10) Patent No.: US 10,516,896 B2
(45) Date of Patent: Dec. 24, 2019

(54) ENCODING DEVICE, ENCODING METHOD, AND STORAGE MEDIUM

(71) Applicant: CANON KABUSHIKI KAISHA, Tokyo (JP)

(72) Inventor: Takafumi Murata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/966,057

(22) Filed: Apr. 30, 2018

(65) Prior Publication Data

US 2018/0324457 A1     Nov. 8, 2018

(30) Foreign Application Priority Data

May 2, 2017 (JP) ................. 2017-091965

(51) Int. Cl.
| | |
|---|---|
| *H04N 7/12* | (2006.01) |
| *H04N 11/02* | (2006.01) |
| *H04N 11/04* | (2006.01) |
| *H04N 19/577* | (2014.01) |
| *H04N 19/30* | (2014.01) |
| *H04N 19/70* | (2014.01) |
| *H04N 19/105* | (2014.01) |
| *H04N 19/114* | (2014.01) |

(52) U.S. Cl.
CPC ......... *H04N 19/577* (2014.11); *H04N 19/105* (2014.11); *H04N 19/114* (2014.11); *H04N 19/30* (2014.11); *H04N 19/70* (2014.11)

(58) Field of Classification Search
None
See application file for complete search history.

(56) References Cited

U.S. PATENT DOCUMENTS

| | | | | |
|---|---|---|---|---|
| 5,917,950 | A * | 6/1999 | Yim ................. | H04N 5/46 382/236 |
| 6,192,080 | B1 * | 2/2001 | Sun .................. | H04N 19/577 348/404.1 |
| 7,917,000 | B2 * | 3/2011 | Shimazaki ........ | H04N 5/772 386/224 |
| 2004/0017850 | A1 * | 1/2004 | Kim ................. | H04N 19/147 375/240.01 |
| 2006/0126952 | A1 * | 6/2006 | Suzuki ............. | G06T 5/002 382/233 |
| 2006/0215759 | A1 * | 9/2006 | Mori ................ | H04N 5/147 375/240.16 |

(Continued)

FOREIGN PATENT DOCUMENTS

JP    2006-094454 A    4/2006

*Primary Examiner* — Talha M Nawaz
(74) *Attorney, Agent, or Firm* — Cowan, Liebowitz & Latman, P.C.

(57) ABSTRACT

An encoding device that performs an encoding process on a moving image by using motion estimation according to the present invention includes: an acquisition unit that acquires a framerate of the moving image; a setting unit that performs setting of the number of reference frames on each frame of the moving image in accordance with the framerate; and an estimation unit that performs the motion estimation by using a frame to be encoded and a reference frame acquired based on the setting, and the setting unit performs the setting such that the number of reference frames is smaller when the framerate is higher.

9 Claims, 7 Drawing Sheets

(56) References Cited

U.S. PATENT DOCUMENTS

| | | | |
|---|---|---|---|
| 2007/0206871 A1* | 9/2007 | Jalil | H04N 19/176 |
| | | | 382/233 |
| 2009/0296824 A1* | 12/2009 | Seo | H04N 5/23248 |
| | | | 375/240.24 |
| 2012/0230390 A1* | 9/2012 | Akkor | H04N 21/23655 |
| | | | 375/240.02 |
| 2016/0173875 A1* | 6/2016 | Zhang | H04N 19/124 |
| | | | 375/240.03 |
| 2017/0094305 A1* | 3/2017 | Li | H04N 19/52 |
| 2018/0262773 A1* | 9/2018 | Chuang | H04N 19/543 |

* cited by examiner

ENCODING DEVICE, ENCODING METHOD, AND STORAGE MEDIUM

BACKGROUND OF THE INVENTION

Field of the Invention

The present invention relates to an encoding device, an encoding method, and a storage medium and, in particular, to an encoding device, an encoding method, and a storage medium that perform motion estimation on a moving image.

Description of the Related Art

In an encoding scheme such as H.264, High Efficiency Video Coding (HEVC), or the like that is an international standard encoding specification for moving images, a technology called motion estimation is used. Such motion estimation is to detect motion between a target frame to be encoded and a reference frame that is temporally different from the target frame and perform moving image compression based on motion information to increase the encoding efficiency.

Japanese Patent Application Laid-Open No. 2006-94454 proposes an art that changes the number of reference frames in accordance with the motion amount in an image. According to this art, it is possible to reduce a processing load for motion estimation by reducing the number of reference frames when the motion amount is small.

In motion estimation, although the accuracy in motion estimation is higher when a plurality of reference frames are used for encoding than when a single reference frame is used, this will increase the processing load accordingly. On the other hand, when the processing load is taken into consideration and the number of reference frames is reduced as in the art disclosed in Japanese Patent Application Laid-Open No. 2006-94454, this may result in a reduction in accuracy of motion estimation and cause image quality deterioration. Accordingly, an appropriate setting of the number of reference frames is a highly important factor.

SUMMARY OF THE INVENTION

An encoding device according to one embodiment of the present invention is an encoding device that performs an encoding process on a moving image by using motion estimation. The encoding device includes: an acquisition unit that acquires a framerate of the moving image; a setting unit that performs setting of the number of reference frames on each frame of the moving image in accordance with the framerate; and an estimation unit that performs the motion estimation by using a frame to be encoded and a reference frame acquired based on the setting.

An encoding method according to one embodiment of the present invention is an encoding method of a moving image using motion estimation. The encoding method includes steps of: acquiring a framerate of the moving image; performing setting of the number of reference frames on each frame of the moving image in accordance with the framerate; and performing the motion estimation by using a frame to be encoded and a reference frame acquired based on the setting.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
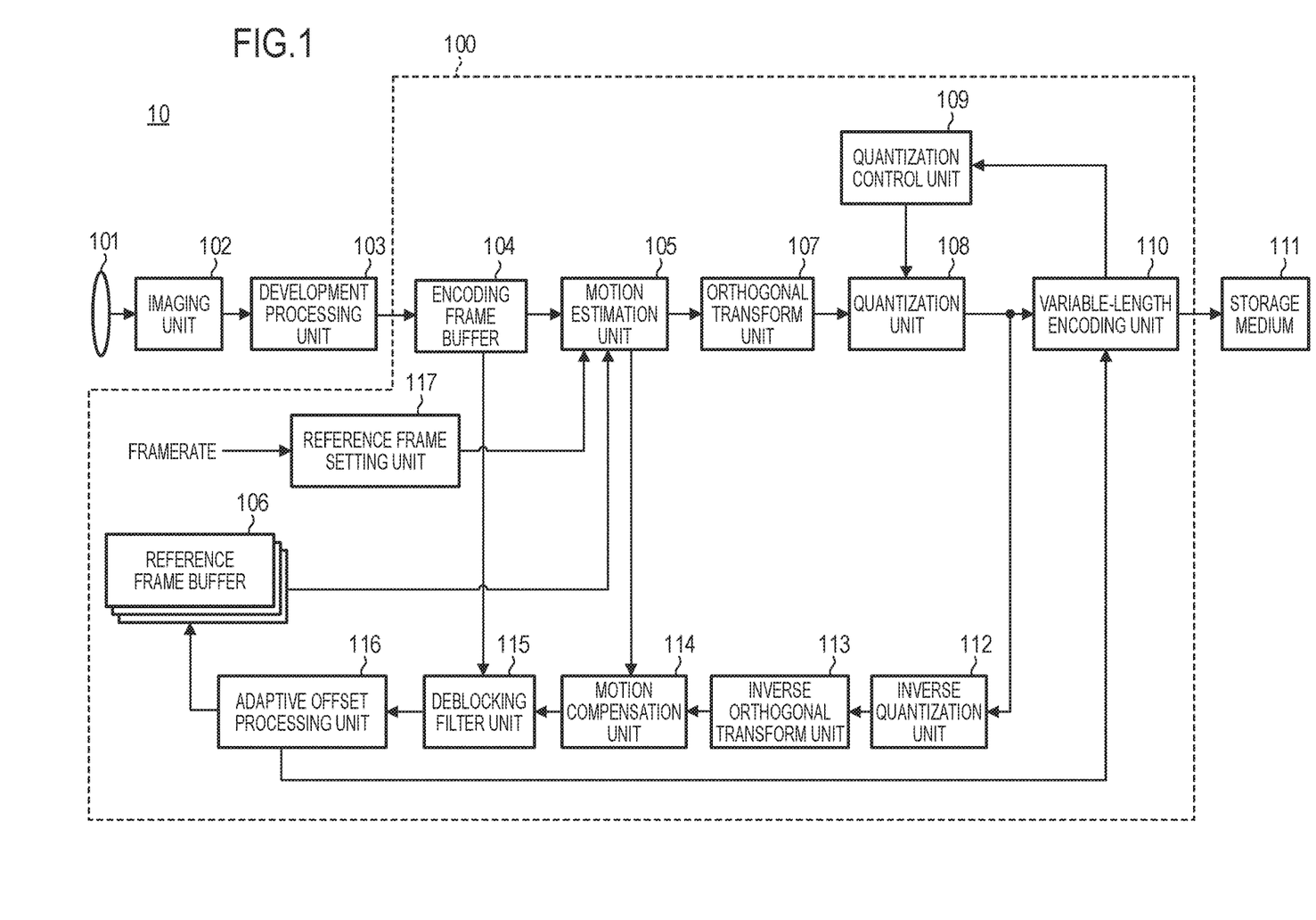
FIG. 1 is a block diagram of an image processing device according to a first embodiment.

FIG. 1 is a block diagram of an image processing device 10 according to the present embodiment. The image processing device 10 has a function of performing an encoding process of a moving image and may be, for example, a digital camera, a digital video camera, a smartphone, a tablet computer, a hard disk recorder, or the like. A digital video camera will be described below as an example of the image processing device 10. The image processing device 10 has an encoding device 100, an optical system 101, an imaging unit 102, a development processing unit 103, and a storage medium 111. The image processing device 10 can use the optical system 101, the imaging unit 102, and the development processing unit 103 to capture an image of a subject and acquire a moving image. Further, the image processing device 10 can use the encoding device 100 to encode a moving image and record the encoded moving image in the storage medium 111.

The optical system 101 includes an optical filter, a zoom lens, a focus lens, an aperture, and a shutter and captures a subject image on the imaging surface of the imaging unit 102. The imaging unit 102 includes an image sensor such as a Complementary Metal Oxide Semiconductor (CMOS), a Charge Coupled Device (CCD), or the like and an analog/digital (A/D) converter. The image sensor converts a subject image from the optical system 101 into an electrical signal, and the A/D converter converts an analog electrical signal into digital image data. The imaging unit 102 acquires image data in accordance with a timing signal from a control unit (not shown) and outputs it to the development processing unit 103. The control unit can change a drive rate (framerate) of the imaging unit 102 based on setting information such as an image capture mode, for example.

The development processing unit 103 performs image processing such as a DeBayer (de-mosaic) process, defect correction, noise removal, a scaling process, color conversion to a YCbCr form on the image data from the imaging unit 102 or the like. The image-processed image data has a format on which compression encoding can be performed and is a target of an encoding process. Hereafter, image-processed image data when a moving image is captured is referred to as an encoding target frame. An encoding target frame is input from the development processing unit 103 to the encoding device 100.

The encoding device 100 performs an encoding process with H.264, an HEVC scheme, or the like on the input encoding target frame. In the following description, the encoding device 100 performs an encoding process with the HEVC scheme.

The encoding device 100 has functions of a motion estimation unit 105, an orthogonal transform unit 107, a quantization unit 108, a quantization control unit 109, and a variable-length encoding unit 110. The encoding device 100 further has functions of an inverse quantization unit 112, an inverse orthogonal transform unit 113, a motion compensation unit 114, a deblocking filter unit 115, an adaptive offset processing unit 116, and a reference frame setting unit 117. Further, the encoding device 100 has an encoding frame buffer 104 and a reference frame buffer 106 within the memory.

The encoding frame buffer 104 sequentially stores encoding target frames input from the development processing unit 103. Encoding target frames are read out in the order of being encoded. The motion estimation unit 105 reads out the encoding target frame from the encoding frame buffer 104 and reads out one or a plurality of reference frames from the reference frame buffer 106 in accordance with a setting made by the reference frame setting unit 117. The motion estimation unit 105 determines block matching between the encoding target frame and the reference frame and detects a motion vector.

That is, the motion estimation unit 105 searches for the most similar block within all the reference frames (hereafter, referred to as an estimated block) for each block of encoding target frames (hereafter, referred to as a target block) and detects a shift of the position of the estimated block to the target block as a motion vector. The motion estimation unit 105 determines a difference of pixel values between an encoding target frame and an estimated frame (a set of estimated blocks) at a position indicated by the detected motion vector and outputs a differential frame comprising the difference to the orthogonal transform unit 107. Further, the motion estimation unit 105 outputs an estimated frame to the motion compensation unit 114 in order to generate a local decode frame. The motion estimation unit 105 functions as an estimation unit that performs motion estimation based on a setting made by the reference frame setting unit 117.

The orthogonal transform unit 107 performs discrete cosine transform on a differential frame from the motion estimation unit 105. The orthogonal transform unit 107 outputs a transform coefficient obtained by discrete cosine transform to the quantization unit 108. The quantization unit 108 performs quantization on the transform coefficient from the orthogonal transform unit 107. Quantization is performed in accordance with the quantization step size input from the quantization control unit 109. The quantization unit 108 outputs the quantized transform coefficient to the variable-length encoding unit 110 and the inverse quantization unit 112. The transform coefficient from the quantization unit 108 is used for encoding stream generation at the variable-length encoding unit 110 and used for local decode frame generation at the inverse quantization unit 112.

The quantization control unit 109 determines the quantization step size based on a generated code amount input from the variable-length encoding unit 110. The quantization control unit 109 can determine a quantization step size so that a preset target code amount (for example, a bitrate of an encoding stream) is obtained.

The variable-length encoding unit 110 acquires a transform coefficient sequence by performing a zigzag scan, an alternate scan, or the like on the quantized transform coefficient and performs variable-length encoding on the transform coefficient sequence. The variable-length encoding unit 110 further variable-length-encodes the encoding scheme information such as a motion vector, a quantization step size, block division information, an adaptive offset parameter, or the like and adds it to the variable-length-encoded transform coefficient sequence to generate an encoded stream. The encoded stream is recorded in the storage medium 111. Further, the variable-length encoding unit 110 calculates a generated code amount for each block in variable-length encoding and outputs it to the quantization control unit 109. The storage medium 111 may be a flash memory, a hard disk, or the like and may be configured to be removable from the encoding device 100.

The inverse quantization unit 112 performs inverse quantization on the quantized transform coefficient from the quantization unit 108 and generates a transform coefficient used for local decode. This transform coefficient is output to the inverse orthogonal transform unit 113. The inverse orthogonal transform unit 113 performs inverse discrete cosine transformation on the transform coefficient from the inverse quantization unit 112 and restores the differential frame. The restored differential frame is output to the motion compensation unit 114.

The motion compensation unit 114 adds the estimated frame from the motion estimation unit 105 and the differential frame from the inverse orthogonal transform unit 113 to generate a local decode frame. The local decode frame is output to the deblocking filter unit 115.

The deblocking filter unit 115 performs a deblocking filter process on the local decode frame from the motion compensation unit 114. The deblocking filter process reduces distortion at a block boundary. The local decode frame after the deblocking filter process is output to the adaptive offset processing unit 116.

The adaptive offset processing unit 116 selects either a band offset process or an edge offset process as an adaptive offset process. The adaptive offset process reduces a ringing distortion inside a block. The adaptive offset processing unit 116 determines adaptive offset parameters necessary for performing an adaptive offset process, such as a band position, an edge direction, an offset value, or the like and performs an adaptive offset process on the local decode frame from the deblocking filter unit 115.

The adaptive offset processing unit 116 stores the local decode frame in the reference frame buffer 106. A local decode frame may be read out by the motion estimation unit 105 as a reference frame used for encoding subsequent encoding target frames. Further, the adaptive offset processing unit 116 outputs the process selected as an adaptive offset process and the adaptive offset parameter to the variable-length encoding unit 110. These pieces of information are used for generating an encoding stream. Note that the adaptive offset processing unit 116 may store the local decode frame from the deblocking filter unit 115 without change in the reference frame buffer 106 without performing an adaptive offset process.

The reference frame setting unit 117 sets the number of reference frames and a reference framerate for each encoding target frame and outputs the setting to the motion estimation unit 105. The reference frame setting unit 117 can change the number of reference frames in accordance with the framerate when a moving image is captured. For example, reference frame setting unit 117 may measure a vertical synchronization signal of the imaging unit 102 to acquire a framerate or may acquire it from frame information added to a frame. That is, the reference frame setting unit 117 functions as an acquisition unit that acquires a framerate of a moving image, a setting unit that sets the number of reference frames for each frame of the moving image in accordance with the framerate, and a selection unit that selects a reference frame used for motion estimation.

Figure 2:
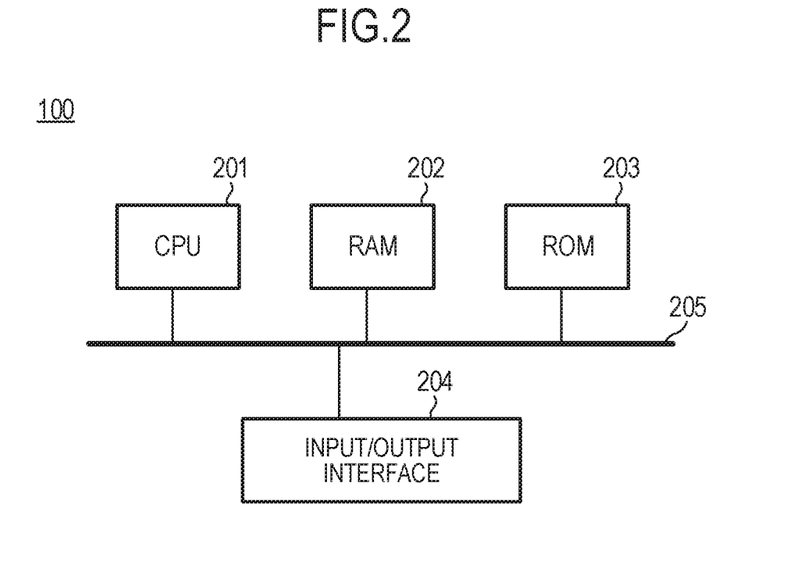
FIG. 2 is a block diagram illustrating a hardware configuration of an encoding device according to the first embodiment.

FIG. 2 is a block diagram illustrating a hardware configuration of the encoding device 100 according to the present embodiment. The encoding device 100 has a central processing unit (CPU) 201, a random access memory (RAM) 202, a read only memory (ROM) 203, an input/output interface 204, and a bus 205.

The CPU 201 reads out and executes a predetermined program from the ROM 203 to implement functions of respective units of the encoding device 100. The CPU 201 stores data obtained in a process in the RAM 202 and externally exchanges data via the input/output interface 204. The RAM 202 is used as a working memory of a program executed by the CPU 201 and temporarily stores data being processed, a program or data read out from the ROM 203, or the like. The RAM 202 may function as the encoding frame buffer 104 or the reference frame buffer 106. The ROM 203 stores therein a program or the like that implements functions of respective units of the encoding device 100. The input/output interface 204 communicably connects the encoding device 100 to the development processing unit 103 and the storage medium 111.

Figure 3:
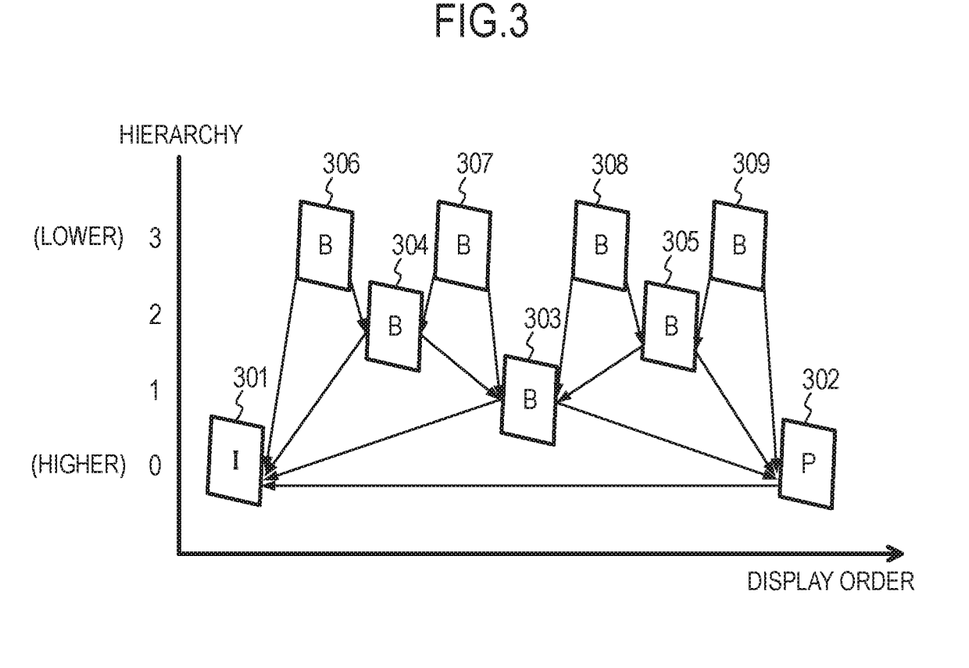
FIG. 3 is a diagram illustrating the estimation structure in motion estimation according to the first embodiment.

FIG. 3 is a diagram illustrating the estimation structure in motion estimation according to the present embodiment. Here, hierarchy estimation structure in random access encoding will be described as an example. The horizontal axis represents the display order of frames, and the vertical axis represents encoding hierarchy to which a frame belongs. Each arrow connected between frames represents a reference relationship in motion estimation. That is, a frame from which an arrow starts is encoded based on motion estimation using a frame at which the arrow ends as a reference frame.

Frames of a moving image are categorized into an Intra coded (I) frame, a Predictive coded (P) frame, and a Bi-directional predictive coded (B) frame. The characters "I", "P", and "B" illustrated in FIG. 3 represent an I-frame, a P-frame, and a B-frame, respectively. The I-frame is a frame where no motion estimation is performed and is encoded by using only information within a frame without a process by the motion estimation unit 105 being performed. The P-frame is a frame where a forward estimation is performed in motion estimation and is encoded with reference to a past frame. The B-frame is a frame where bi-directional estimation is performed in motion estimation and is encoded with reference to both past and future frames.

Hierarchy numbers are now defined for respective encoding hierarchies as follows. The encoding hierarchy of the I-frame 301 and the P-frame 302 is defined as hierarchy number 0, and the encoding hierarchy of the B-frame 303 is defined as hierarchy number 1. Further, the encoding hierarchy of the B-frames 304 and 305 is defined as hierarchy number 2, and the encoding hierarchy of the B-frames 306 to 309 is defined as hierarchy number 3. In this case, a smaller hierarchy number is defined as a higher hierarchy. Further, while reference from a lower hierarchy to a higher hierarchy or reference between the same hierarchy can be made, no reference can be made from a higher hierarchy to a lower hierarchy. A temporal identifier (Temporal ID) in HEVC can be used as a hierarchy number indicating an encoding hierarchy.

The smaller the hierarchy number is, that is, the higher the hierarchy is, the larger the code amount allocated to a frame (encoded data amount) is. In the example of FIG. 3, the code amount of the I-frame 301 and the P-frame 302 belonging to the hierarchy 0 is the largest, and the code amount decreases from the B-frame 303 belonging to the hierarchy 1, the B-frames 304 and 305 belonging to the hierarchy 2, and the B-frames 306 to 309 belonging to the hierarchy 3 in this order.

The reference relationships to respective frames are as follows. The P-frame 302 refers to the I-frame 301. The B-frame 303 refers to the I-frame 301 and the P-frame 302. The B-frame 304 refers to the I-frame 301 and the B-frame 303. The B-frame 305 refers to the P-frame 302 and the B-frame 303. The B-frame 306 refers to the I-frame 301 and the B-frame 304. The B-frame 307 refers to the B-frame 303 and the B-frame 304. The B-frame 308 refers to the B-frame 303 and the B-frame 305. The B-frame 309 refers to the P-frame 302 and the B-frame 305.

Frames belonging to different encoding hierarchies are different in the temporal distance to a frame to be referred (hereafter, referred to as a reference distance), respectively. The reference distance is represented by the number of frame periods that are frame intervals of a moving image. For example, in the hierarchy 0, the reference distance of the P-frame 302 that refers to the I-frame 301 is eight frame periods. In the hierarchy 1, the reference distance of the B-frame 303 that refers to the I-frame 301 and the P-frame 302 is four frame periods. Further, in the hierarchy 2, each of the reference distance of the B-frame 304 that refers to the I-frame 301 and the B-frame 303 and the reference distance of the B-frame 305 that refers to the B-frame 303 and the P-frame 302 is two frame periods. Similarly, in the hierarchy 3, the reference distance of the B-frames 306 to 309 that refer to the previous and subsequent frames, respectively, is one frame period. In this way, a lower hierarchy has a shorter reference distance.

Next, an encoding process of two types of moving images A and B described below is considered by using the estimation structure illustrated in FIG. 3. The framerate of the moving image A is 60P (60 frames per second, progressive scan), and the resolution thereof is 4096 by 2160 pixels. The framerate of the moving image B is 240P (240 frames per second, progressive scan), and the resolution thereof is 2048 by 1080 pixels. In comparison of the moving image B to the moving image A, the framerate is fourfold, and the resolution is one-fourth, and thus there is no change in the substantial data amount per unit time. Further, according to FIG. 3, the number of frames to be referred by each of the B-frames 303 to 309 except the I-frame 301 and the P-frame 302 is two.

The encoding process is roughly categorized into two processes, namely, a hardware process and a firmware process that performs a resister setting. In a hardware process, the process performance per unit time is constant, and process time per frame changes in accordance with the resolution. In contrast, in a firmware process, process time per frame is constant. Base on the above, a hardware process and a firmware process in encoding of the moving image B will be considered, respectively.

For a hardware process, while the process time per frame is one-fourth because the resolution is one-fourth, the framerate is fourfold, and therefore the process time does not change compared to the moving image A. On the other hand, for a firmware process, while the process time per frame does not change even when the resolution is one-fourth, the framerate is fourfold, and therefore the process time increases compared to the moving image A.

Therefore, in an encoding process of the moving image B performed at a high framerate, the entire process time that is a sum of the hardware process time and the firmware process time is longer than that in the encoding process of the moving image A. That is, as in the case of the moving image A and the moving image B, even when the substantial data amount per unit time is the same, the moving image B with a higher framerate requires longer process time in performing an encoding process. Thus, when only the data amount per unit time is taken into consideration to perform an encoding process of a moving image, this is likely to cause process delay, which means that a process of an encoding target frame may not be completed within one frame period. Occurrence of such process delay may make a real time encoding process difficult and require a large amount of buffer. In order to avoid process delay, it may be necessary to enhance a processing performance of the encoding device 100 and increase the circuit size accordingly.

The encoding device 100 of the present embodiment restricts the number of reference frames to one instead of plural for a part of the encoding target frames when processing a moving image with a high framerate. Thereby, the process time required for an encoding process is reduced, and an increase in the process time due to a higher framerate can be suppressed. The high framerate may be, for example, 240 frames per second (fps), 300 fps, 600 fps, 960 fps, 1200 fps, or the like.

Typically, while reduction in the number of reference frames causes image quality deterioration, since an image correlation is high among frames at the high framerate, image quality deterioration is reduced even with the reduced number of reference frames. At this time, a frame in which the number of reference frames is set small (for example, one) is selected with priority from the frame belonging to a lower hierarchy having a smaller reference distance in the estimation structure illustrated in FIG. 3. Specifically, first, the B-frames 306 to 309 of the hierarchy 3 whose reference distance is one frame period are selected. Next, the B-frames 304 and 305 of the hierarchy 2 whose reference distance is two frame periods are selected. Finally, the B-frame 303 of the hierarchy 1 whose reference distance is four frame periods are selected. Since the correlation among frames belonging to a lower hierarchy whose reference distance is small is considered to be high, the above selection method can further reduce image quality deterioration due to reduction in the number of reference frames.

Figure 4:
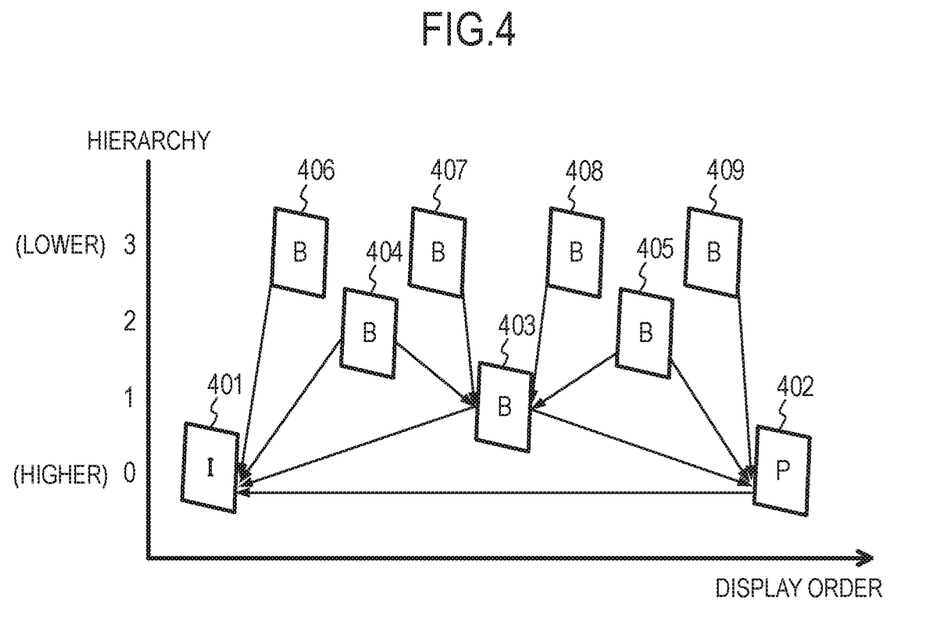
FIG. 4 is a diagram illustrating an example of the estimation structure according to the first embodiment.

FIG. 4 illustrates an example of the estimation structure when the moving image B with a high framerate is encoded. The estimation structure of FIG. 4 is the same as the estimation structure illustrated in FIG. 3 except the reference relationships among frames. The I-frame 401, the P-frame 402, and the B-frames 403 to 409 of FIG. 4 correspond to the I-frame 301, the P-frame 302, and the B-frames 303 to 309 of FIG. 3, respectively.

In the estimation structure illustrated. FIG. 4, the number of frames referred to by the B-frames 406 to 409 belonging to the hierarchy 3 is one. In determination as to which of the previous frame or the subsequent frame is selected, a less deteriorated frame is selected. This is because selecting a less deteriorated frame as a reference frame can reduce image quality deterioration due to motion estimation. Here, a less deteriorated frame means a frame to which a larger code amount is allocated, that is, a frame belonging to a higher hierarchy.

Based on the above, a selection method of a reference frame in reducing the number of reference frames will be specifically described using FIG. 4. Here, an example where the number of reference frames is changed from two to one will be described. The frame to which the B-frame 406 can refer is the B-frame 404 and the I-frame 401. Since the hierarchy number of the B-frame 404 is two and the hierarchy number of the I-frame 401 is zero, the I-frame 401 is in a higher hierarchy than the B-frame 404. Therefore, the reference frame of the B-frame 406 is determined to be the I-frame 401 belonging to a higher hierarchy.

Similarly, the B-frame 407 can refer to the B-frame 403 whose hierarchy number is one and the B-frame 404 whose hierarchy number is two, and the B-frame 403 having the smaller hierarchy number, that is, being in the higher hierarchy is selected as a reference frame. Further, the B-frame 408 can refer to the B-frame 403 whose hierarchy number is one and the B-frame 405 whose hierarchy number is two, and the B-frame 403 having the smaller hierarchy number, that is, being in the higher hierarchy is selected as a reference frame. Further, the B-frame 409 can refer to the P-frame 402 whose hierarchy number is zero and the B-frame 405 whose hierarchy number is two, and the P-frame 402 having the smaller hierarchy number, that is, being in the higher hierarchy is selected as a reference frame. Accordingly, by selecting a less deteriorated reference frame to which a larger code amount is allocated, it is possible to reduce image quality deterioration due to a change in the number of reference frames from two to one.

Figure 5:
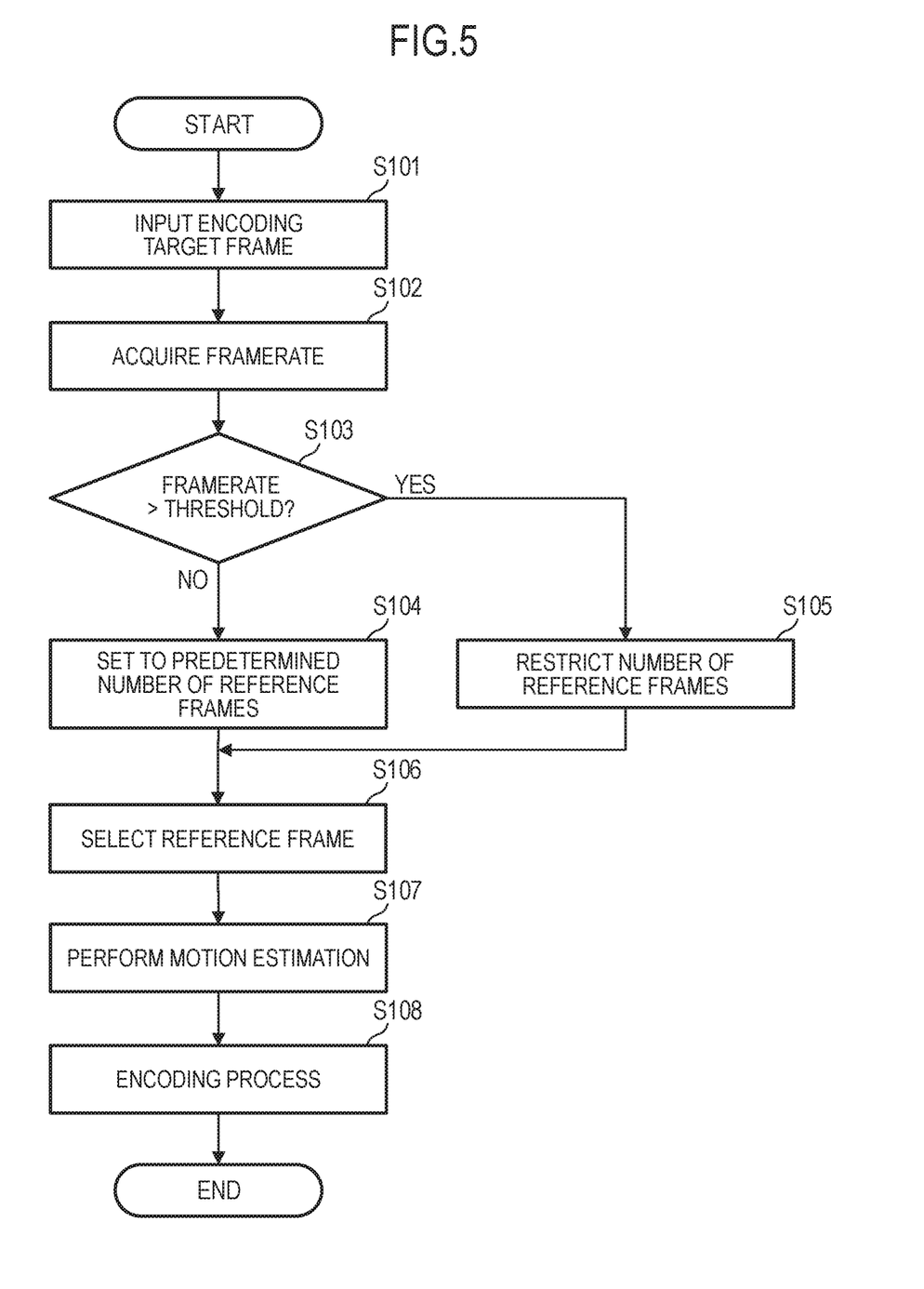
FIG. 5 is a flowchart illustrating the operation of the encoding device according to the first embodiment.

FIG. 5 is a flowchart illustrating the operation of the encoding device 100 according to the present embodiment. Here, the operation when the image processing device 10 captures a moving image will be described. The encoding device 100 performs the following process on each frame of a moving image stored in the encoding frame buffer 104.

First, the motion estimation unit 105 inputs an encoding target frame (step S101). That is, the motion estimation unit 105 reads out a frame to be a target of an encoding process from the encoding frame buffer 104. Next, the reference frame setting unit 117 acquires a framerate of the moving image being captured (step S102). For example, the reference frame setting unit 117 acquires a framerate from additional information of the encoding target frame.

Subsequently, the reference frame setting unit 117 determines whether or not the acquired framerate is higher than a predetermined threshold (step S103). If the framerate is less than or equal to the predetermined threshold (step S103, NO), the reference frame setting unit 117 sets the number of reference frames to a predetermined number (step S104). For example, the reference frame setting unit 117 sets the reference frame number to two regardless of the corresponding frame type (I-frame, P-frame, B-frame) as illustrated in FIG. 3.

On the other hand, if the framerate is higher than the predetermined threshold (step S103, YES), the reference frame setting unit 117 restricts the number of reference frames and applies a setting where the number of reference frames is small (step S105). For example, when the encoding target frame corresponds to any of the B-frames 406 to 409 on the hierarchy 3 illustrated in FIG. 4, the reference frame setting unit 117 sets the number of reference frames of the encoding target frame to one. Any restriction method of the number of reference frames may be employed as long as a smaller number of reference frames is set for a higher framerate.

Subsequently, the reference frame setting unit 117 selects a reference frame based on the number of reference frames (step S106). For example, when the number of reference frames is set to one and the encoding target frame corresponds to the B-frame 407 of FIG. 4, the reference frame setting unit 117 selects the B-frame 403 as a reference frame. The motion estimation unit 105 reads out the selected reference frame from the reference frame buffer 106 and performs motion estimation by using the encoding target frame and the reference frame (step S107).

Next, the encoding device 100 performs an encoding process by using motion estimation (step S108). That is, the motion estimation unit 105 outputs a differential frame based on a motion vector to the orthogonal transform unit 107. The orthogonal transform unit 107 performs discrete cosine transform on the differential frame and outputs a transform coefficient to the quantization unit 108. The quantization unit 108 performs quantization of the transform coefficient and outputs the quantized transform coefficient to the variable-length encoding unit 110. The variable-length encoding unit 110 performs variable-length encoding on a transform coefficient sequence and outputs an encoded stream.

As described above, according to the present embodiment, such a setting is applied that the number of reference frames is reduced when the framerate is high. For the encoding target frame, the number of reference frames is reduced in ascending order from a frame with a smaller temporal distance to a reference frame. Furthermore, as a reference frame at this time, a reference frame which is less deteriorated, that is, corresponding to a higher hierarchy is selected. This can reduce the processing load necessary for motion estimation while suppressing image quality deterioration.

Further, while the time required for a process per frame decreases for a higher framerate, the process time per frame in the firmware process does not change. Thus, an increase in the framerate may result in delay in the encoding process. To address this, according to the present embodiment, frames having a smaller number of reference frames are increased for a moving image having a high framerate. That is, the ratio of frames set with the reduced number of reference frames of a moving image is increased. Thereby, it is possible to suppress an increase in the time required for an encoding process without increasing the circuit size and prevent occurrence of delay.

Second Embodiment

In the present embodiment, a moving image whose framerate is higher than that in the first embodiment will be described. The difference from the first embodiment will be mainly described below.

Encoding processes of two types of the following moving images A and C will be considered. The framerate of the moving image A is 60P (60 frames per second, progressive scan), and the resolution thereof is 4096 by 2160 pixels. The framerate of the moving image C is 960P (960 frames per second, progressive scan), and the resolution thereof is 1024 by 540 pixels. In comparison of the moving image C with the moving image A, the framerate is 16-fold, and the resolution is 1/16, and thus there is no change in the substantial data amount per unit time. Next, a hardware process and a firmware process when an encoding process of the moving image C is performed will be considered, respectively.

For a hardware process, while the process time per frame is 1/16 because the resolution is 1/16, the framerate is 16-fold, and therefore the process time does not change compared to the moving image A. On the other hand, for a firmware process, while the process time per frame does not change even when the resolution is 1/16, the framerate is 16-fold, and therefore the process time further increases compared to the moving image B of the first embodiment.

Figure 6:
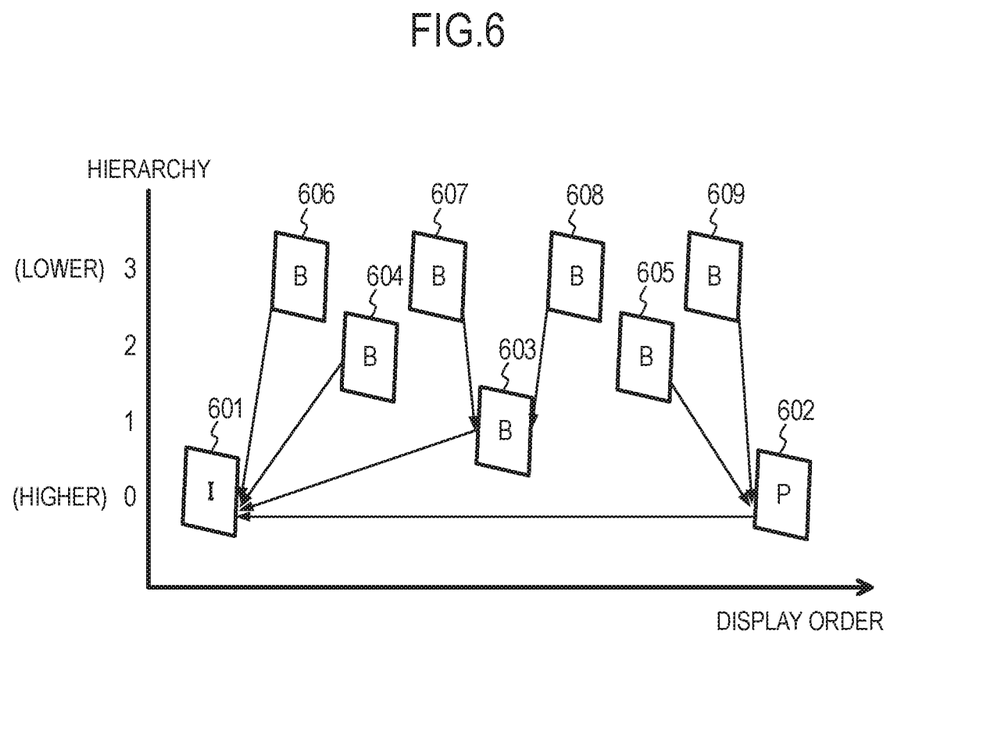
FIG. 6 is a diagram illustrating an example of the estimation structure according to a second embodiment.

The encoding device 100 of the present embodiment restricts the number of reference frames to one from plural for more encoding target frames than the encoding device of the first embodiment. That is, while the number of reference frames is set to one for the encoding target frame having a reference distance of one frame period in the first embodiment, the number of reference frames is set to one also for the encoding target frame having a reference distance is two frame periods. FIG. 6 illustrates an example of the estimation structure when the moving image C is encoded. The estimation structure of FIG. 6 is the same as the estimation structure illustrated in FIG. 3 except the reference relationships among frames. The I-frame 601, the P-frame 602, and the B-frames 603 to 609 of FIG. 6 correspond to the I-frame 301, the P-frame 302, and the B-frames 303 to 309 of FIG. 3, respectively.

The B-frame 604 can refer to the I-frame 601 whose hierarchy number is zero and the B-frame 603 whose hierarchy number is one, and the I-frame 601 having the smaller hierarchy number, that is, being in the higher hierarchy is selected as a reference frame. Similarly, the B-frame 605 can refer to the P-frame 602 whose hierarchy number is zero and the B-frame 603 whose hierarchy number is one, and the P-frame 602 having the smaller hierarchy number, that is, being in the higher hierarchy is selected to be referred to.

Next, in order to further reduce the processing load required for motion estimation, a case where the ratio of frames where the number of reference frames of a moving image is set to one will be described. For example, the number of reference frames is set to one also for the B-frame 603 whose reference distance is four frame periods. The B-frame 603 can refer to the I-frame 601 whose hierarchy number is zero and the P-frame 602 whose hierarchy number is zero, and both frames have the hierarchy number of zero, that is, on the same hierarchy. Then, a selection method of a reference frame when the frames that can be referred to are on the same hierarchy will be described.

In the case of the same hierarchy number, that is, on the same hierarchy, the amount of allocated codes increases in the order of the frame types from I-frame, P-frame, to B-frame. Therefore, the I-frame 601 to which more codes are allocated is selected as a reference frame for an encoding target frame whose number of reference frames is changed from plural to one.

Figure 7:
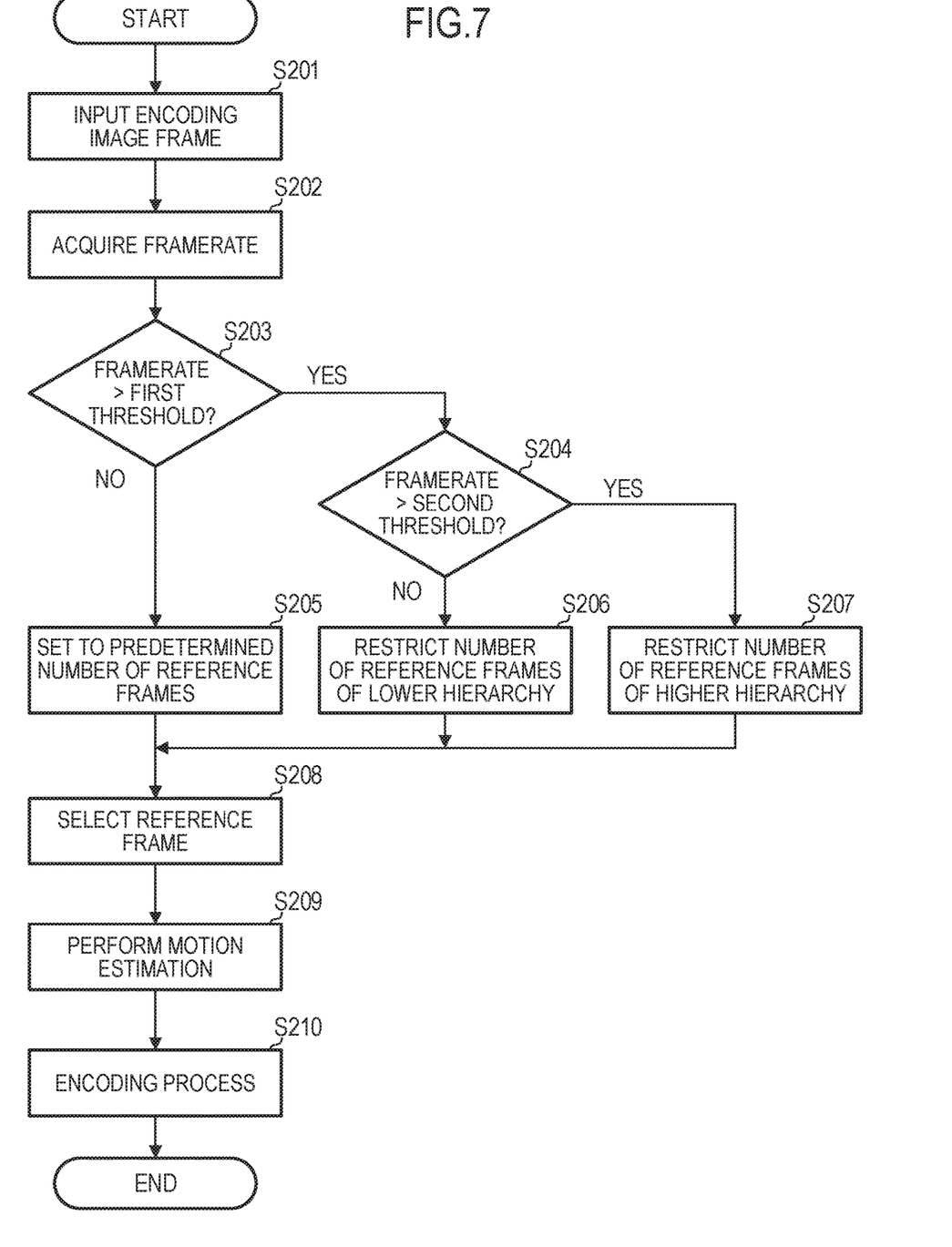
FIG. 7 is a flowchart illustrating the operation of an encoding device according to the second embodiment.

FIG. 7 is a flowchart illustrating the operation of the encoding device 100 according to the present embodiment. The process from step S201 to step S203 is the same as the process from steps S101 to step S103 in the first embodiment.

The reference frame setting unit 117 determines whether or not the acquired framerate is higher than a predetermined first threshold (step S203). The first threshold is 240 fps, for example. If the framerate is less than or equal to the first threshold (step S203, NO), the reference frame setting unit 117 sets the number of reference frames to a predetermined number (step S205). For example, the reference frame setting unit 117 sets the number of reference frames to two regardless of the corresponding frame type, as illustrated in FIG. 3.

If the framerate is higher than the first threshold (step S203, YES), the reference frame setting unit 117 further determines whether or not the framerate is higher than a predetermined second threshold (step S204). The second threshold is 960 fps, for example. If the framerate is less than or equal to the second threshold (step S204, NO), the reference frame setting unit 117 restricts the number of reference frames for the frame belonging to a lower hierarchy (step S206). For example, when the encoding target frame corresponds to any of the B-frames 606 to 609 of the hierarchy 3 illustrated in FIG. 6, the reference frame setting unit 117 sets the number of reference frames to one.

On the other hand, if the framerate is higher than the second threshold (step S204, YES), the reference frame setting unit 117 restricts the number of reference frames for the frame belonging to a higher hierarchy (step S207). For example, when the encoding target frame corresponds to any of the B-frame 604 or 605 of the hierarchy 2 illustrated in FIG. 6, the reference frame setting unit 117 sets the number of reference frames to one.

Subsequently, the reference frame setting unit 117 selects a reference frame based on the number of reference frames (step S208). For example, when the number of reference frames is set to one and the encoding target frame corresponds to the B-frame 604 of FIG. 6, the reference frame setting unit 117 selects the I-frame 601 as a reference frame. The subsequent process from step S208 to step S210 is the same as the process from step S106 to step S108 in the first embodiment.

According to the present embodiment, for a frame belonging to a higher hierarchy in addition to a frame belonging to a lower hierarchy, the number of reference frames is to be restricted. A ratio of frames in which the number of reference frames of a moving image is restricted is increased for a higher framerate. Thereby, it is possible to suppress an increase in the time required for an encoding process without increasing the circuit size and prevent occurrence of delay.

Modified Embodiments

While the present invention has been described above based on the preferred embodiments, the present invention is not limited to these embodiments, and various forms within a scope not departing from the spirit thereof are included in the present invention. For example, the predetermined number of reference frames is not limited to two but may be any number (for example, three to sixteen) that can be set in an encoding scheme employed by the encoding device 100. Further, the number of encoding hierarchies in motion estimation is not limited to four. Furthermore, a framerate may be compared to three or more different thresholds, and any hierarchy in which the number of reference frames is restricted in accordance with the framerate may be set so that the number of reference frames is reduced for a higher framerate.

The object to which the present invention can be applied is not limited to the encoding device 100 described in the embodiments described above. For example, even with a system in which the encoding device 100 is formed of a plurality of devices, the same function as that in the embodiments described above can be realized.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g. central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-091965, filed on May 2, 2017, which is hereby incorporated by reference herein in its entirety.

What is claimed is:

1. An encoding device that performs an encoding process on a moving image by using motion estimation, the encoding device comprising:
    an acquisition unit that acquires a framerate of the moving image;
    a setting unit that performs setting of the number of reference frames on each frame of the moving image in accordance with the framerate;
    a selection unit that, out of a plurality of reference frames categorized into a plurality of hierarchies in accordance with a code amount, selects a reference frame used for motion estimation with the frame to be encoded with prioritization on a reference frame belonging to a higher hierarchy in which the code amount is larger; and
    an estimation unit that performs the motion estimation by using a frame to be encoded and the selected reference frame,
    wherein the setting unit performs the setting such that the number of reference frames is smaller when the framerate is higher, and
    wherein the selection unit selects an I-frame on which the motion estimation is not performed, a P-frame on which forward estimation is performed in the motion estimation, and a B-frame on which bidirectional estimation is performed in the motion estimation in this order out of reference frames categorized into the same hierarchy.

2. The encoding device according to claim 1, wherein, when the framerate is higher, the setting unit increases a ratio of frames of the moving image for which the setting is performed.

3. The encoding device according to claim 1 further comprising a second selection unit that selects a reference frame used in the motion estimation with priority on a reference frame having a smaller temporal distance to the frame to be encoded.

4. The encoding device according to claim 1, wherein the setting unit performs the setting such that the number of reference frames is one when the framerate is higher than a predetermined threshold.

5. The encoding device according to claim 1, wherein the setting unit performs the setting such that an encoding process of each frame for the moving image is completed within one frame period.

6. The encoding device according to claim 5, wherein the setting unit performs the setting taking into consideration of a firmware process in which process time per frame is constant.

7. The encoding device according to claim 1, wherein the hierarchies are represented using a temporal identifier in High Efficiency Video Coding (HEVC).

8. An encoding method of a moving image using motion estimation, the encoding method comprising steps of:
  acquiring a framerate of the moving image;
  performing setting of the number of reference frames on each frame of the moving image in accordance with the framerate;
  selecting, out of a plurality of reference frames categorized into a plurality of hierarchies in accordance with a code amount a reference frame used for motion estimation with the frame to be encoded with prioritization on a reference frame belonging to a higher hierarchy in which the code amount is larger; and
  performing the motion estimation by using a frame to be encoded and the selected reference frame,
  wherein the number of reference frames is set to be smaller when the framerate is higher, and
  wherein the selecting step selects an I-frame on which the motion estimation is not perform, a P-frame on which forward estimation is performed in the motion estimation, and a B-frame on which bidirectional estimation is performed in the motion estimation in this order out of reference frames categorized into the same hierarchy.

9. A non-transitory storage medium including a program that causes a computer to function as each of the units of the encoding device according to claim 1.

* * * * *